2,966,419

BLACK INKS FOR BALL POINT FOUNTAIN PENS

Norman L. Anderson, Hamburg, N.Y., assignor to Allied Chemical Corporation, a corporation of New York No Drawing. Filed Nov. 25, 1957, Ser. No. 698,380

9 Claims. (Cl. 106—23)

This invention relates to black inks for ball point fountain pens, which inks are characterized by high color strength and high color concentration in combination with excellent light fastness and water fastness.

The inks of the present invention contain high concentrations (preferably 40% to 50% by weight) of dissolved color. Their color strength exceeds that of conventional fountain pen inks by a factor of 20 fold or more. For example, one cubic centimeter of an ink of the present invention will provide a written line of 10,000 to 15,000 feet, equivalent to about 50,000 to 70,000 words, whereas an equal volume of conventional ink will provide a line of only 500 to 750 feet, equivalent to about 2,500 to 4,000 words. Ball point pens supplied with the inks of the present invention may be used, at average rates, for long periods before purchase of a refill cartridge containing a new ink supply is required. This advantage is important in enabling ball point fountain pens to compete successfully with conventional fountain pens.

Because of certain structural features of ball point pens, inks for ball point fountain pens must meet many exacting specifications if satisfactory, trouble-free service is to be obtained. The pen comprises a hollow tube open at the upper end and tapered at the lower end to a socket in which a hard (stainless steel, tungsten carbide, or sapphire) ball, having a diameter of about 1 millimeter, rotates. Clearance between the ball and socket varies from 1 to 5 microns depending on the style of pen and viscosity of ink used. The hollow tube serves as the ink reservoir which feeds the ink by gravity into the socket and against the upper surface of the ball. When the pen is used, the ball rotates and transfers ink onto the receiving surface.

Although it is highly desirable that ball point fountain pen inks shall have a very high concentration of color value, it is likewise important that the color should not crystallize out; this is particularly likely to happen if solvent evaporates from ink at the open tip of the ball point, which results in a "freezing" of the ball to the socket. Accordingly the solvent used in the ink should have a low vapor pressure to avoid this evaporation. Likewise for water-fast colors the solvent should not be so hygroscopic that sufficient water will be absorbed from the atmosphere into ink exposed at the ball point to cause precipitation of color. For similar reasons the ink formulation must be free of dust, grit, and insoluble matter and must be non-corrosive to the ball, socket or channel parts of the pen.

A ball point pen ink should be sufficiently viscous so that the ink will neither seep past the ball nor leak from the open upper end of the reservoir tube when the pen is inverted. Yet it must also be sufficiently fluid so that a film of ink is drawn between the ball and socket and onto the writing surface without producing an excessive drag on the ball as it rotates. Such drag causes the ink line to be thin with a resultant loss of color intensity, definition and legibility. The viscosity should also change very little within the range of temperatures at which use of the pen may be required.

Ball point pen inks must also have good light fastness and water fastness if adequate permanence of the written record is to be assured. For example, U.S. Government Federal Specifications No. TT-1-562 of June 12, 1950, require that ball point fountain pen inks meeting the specifications must provide samples of writing that remain legible after (1) 48 hours exposure to intense ultraviolet irradiation in the "Fade-O-Meter" instrument for measuring the light fastness of colorants, and (2) soaking in water at room temperature for a like period; (the tests are made on separate samples). Under these test conditions, samples of writing made from the inks of the present invention (1) fade only slightly after 100 hours exposure in the "Fade-O-Meter" and (2) remain fast and do not run appreciably after soaking in water for 48 hours.

It has heretofore been known that diaryl guanidine salts of acid forms of sulfonic acid dyes are, as a rule, soluble in ethanol and the like and hence useful for dyeing pyroxylin lacquers, spirit varnishes and the like. However, tests of hundreds of such colorants have shown that less than 0.5% of those tested had the color strength, light fastness, water fastness and especially the solubility in the ink solvents of the present invention required to make a ball point fountain pen ink of acceptable quality. No relationship is known which would enable one to predict whether or not a colorant is suitable for the ink formulations of the present invention upon the basis of the molecular structure of the colorant.

The only commercially available prior art inks providing writings which do not fade substantially completely after 8 to 20 hour "Fade-O-Meter" exposures and which remain legible after soaking in water for 48 hours have been certain blue inks based on light-fast and water-fast copper phthalocyanine derivatives. Inks colored exclusively with such copper phthalocyanine derivatives are somewhat weak in color strength and are of an unpopular greenish hue.

Heretofore ball point ink manufacturers have been unable to offer black inks having a quality comparable to that of blue inks based on copper phthalocyanine derivatives because no colorants or combinations of colorants were known which possessed the requisite color, color strength, light-fastness, and water-fastness in combination with adequate solubility in solvents having the required combination of vapor pressure and flow properties. Since the inks of the present invention do have this combination of properties they satisfy a long felt need in the art. Black inks of good quality have been particularly desired because they enjoy wide consumer preference, provide the best definition and contrast, and are more easily reproduced by photostating and other duplication methods.

The black colorants of the inks of the present invention have the following formula:

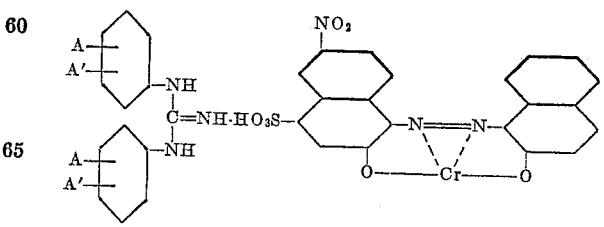

wherein the 6-member rings are benzene rings, A and A' represent members of the group consisting of H, $CH_3$, $C_2H_5$, $C_3H_7$ and i-$C_3H_7$ located in any of positions 2–6 in the rings.

Preferred colorants are those wherein A and/or A' are $C_1$–$C_3$ alkyl groups. The colorant wherein both A and A' are hydrogen does not possess the extreme solubility of the preferred class of colorants but is less expensive and is useful for imparting light fastness and water fastness to ink formulations containing other colorants.

The colorants characterizing the inks of the present invention combine good color strength, good light-fastness and good water-fastness with good to extreme solubility in the solvent media, hereinafter defined, which characterize the inks of the present invention.

The colorants are ordinarily prepared by heating a mixture of an aqueous solution of the diaryl guanidine component and an aqueous solution of the acid dye component. The resulting diaryl guanidine salt of the acid form of the color (which salt must be insoluble in water if the color is to be waterfast) precipitates out and is then isolated, dried and ground.

The solvent characterizing the inks of the present invention consists—to the extent of at least 90% by weight—of a compound or a mixture of such compounds having the general formula:

$$R'O(RO)_nH$$

wherein R' is selected from the group consisting of H and $C_1$–$C_8$ alkyl groups, R is an alkylene group containing from 2 to 10 (inclusive) carbon atoms, $n$ is an integer from 1 to 5, inclusive, and the total number of carbon atoms is from 2 to 10, inclusive.

Preferred solvents of this class are diols, i.e. compounds of the above general formula wherein R' is hydrogen. Representative solvents of this class include ethylene glycol, propylene glycol, butane diol-1,3, hexylene glycol, octylene glycol, monomethyl ether of ethylene glycol ("Methyl Cellosolve"), diethylene glycol, triethylene glycol, dipropylene glycol, and monoethyl ether of diethylene glycol ("Carbitol").

The inks of this invention should contain at least 25% of dissolved color to assure adequate color strength (this dissolved color may include, however, colorants other than those characterizing the present invention). Preferably the color concentration should be from 40% to 50%. Color concentrations as high as 55% to 60% are obtainable with some formulations. This is surprising because the solvents are relatively hydrophilic in character whereas the colors are very insoluble in water. The viscosity desired for the ink may vary according to the style of the pen, particularly with reference to the clearance between the ball and socket at the ball point. In general the desired viscosity will range between 8,000 and 15,000 c.p.s. at 25° C. Usually the desired viscosity is obtained simply by adjusting the color content of the ink because, at the high color concentrations involved, small changes in color concentration produce relatively large changes in viscosity. Viscosity may also be adjusted by incorporating a suitable resin into the ink although usually this is neither necessary nor desirable.

If it is desired to modify the color of the ink a shading component may be included. The following colors (in percentages limited by their relatively low solubilities) have been found to be suitable as shading components: Auramine O (New Colour Index Basic Yellow 2); Victoria Green WB (New Colour Index Basic Green 4); Eosine OJ (New Colour Index Acid Red 87); Ethyl Eosine (Old Colour Index No. 770); Iosol Red (New Colour Index Solvent Red 68). Other colorants may be present in larger proportions. For example the blue copper phthalocyanine derivatives or the blue diaryl guanidine salts of Wool Violet 4BN or Brilliant Blue FFR which are described in my copending application Serial No. 698,332, filed November 25, 1957, entitled "Blue Inks for Ball Point Fountain Pens and Novel Colorants Therefor."

It is often desirable to incorporate in the ink about 1% to 5% by weight of oleic acid or the like to lubricate the ball and socket.

Despite the fact that the solvent medium has a very low vapor pressure, the "drying" time of the inks of the invention is satisfactory because the solvent is absorbed by the paper and because the ink film laid down by the pen is very thin and contains a relatively low solvent/color ratio when compared to other inks.

The inks are made by dissolving the color in the solvent, suitably by use of a high speed agitator, and then centrifuging the resulting solution to remove the last traces of insoluble matter.

The following representative examples describe inks within the scope of the present invention.

EXAMPLE 1

(A) *Preparation of colorant*

The colorant used in this example is a salt in which the basic component is di-(ortho-ethyl phenyl) guanidine (obtained by condensing o-ethylaniline with carbon bisulfide and treating the reaction product with ammonia and litharge), and the acid component is the acid form of the dyestuff known as New Colour Index Acid Black 52, which dyestuff is prepared, in a manner well known to the prior art, by diazotizing 1-amino-2-hydroxy-6-nitronaphthalene-4-sulfonic acid, coupling the diazotization product with beta naphthol, and chroming the resulting monoazo compounds. 511 parts (one mol equivalent) of the sodium salt of the above-described chromed monoazo dye were dissolved in 850 parts of water at 80° C. The solution was charged with a solution of 267 parts (one mol equivalent) of di-(ortho-ethyl phenyl) guanidine in 3000 parts of water. 11.6 parts of 20° Bé. aqueous hydrochloric acid were added in small increments during one hour. When addition of acid was complete the product precipitated out and was isolated by filtration. The filter cake was washed with 2000 parts of cold water, dried at 70–80° C., and ground to a fine powder. A yield of 630 parts was obtained (Colorant A).

(B) *Solubility of colorant in solvents suitable for ink formulation*

Colorant A was found to be readily soluble at room temperature in the following solvents to give crystal free solutions of at least the indicated concentration.

| Solvent: | Parts of color in 100 parts of solution |
|---|---|
| Diethylene glycol | 50 |
| Triethylene glycol | 45 |
| 1,3-butanediol | 30 |
| Octylene glycol | 30 |
| Mixture of 50% butane diol and 50% octylene glycol | 50 |
| Monoethyl ether of diethylene glycol ("Carbitol") | 40 |
| Hexylene glycol | 40 |
| Propylene glycol | 30 |

These figures do not necessary represent the maximum solubility of the colorant in the solvent.

(C) *Preparation of ink*

An ink was prepared by agitating the following mixture in a high speed agitator at 70° to 80° C. until the colorant was substantially completely dissolved in the solvent.

| Component: | Parts by weight |
|---|---|
| 1,3-Butanediol | 25 |
| Octylene glycol | 25 |
| Oleic acid | 5 |
| Colorant A | 45 |

The resulting solution was centrifuged to remove traces of insoluble matter. The resulting ink had a viscosity of 12,400 c.p.s. at 25° C. It wrote freely and evenly in ball point fountain pens giving a well defined black line of good color intensity which "dried" quickly and showed good resistance to smearing, feathering, offset and bleeding. It shows satisfactory writing characteristics over the temperature range 0°–100° F.

The color concentration of the ink was tested in a "mechanical scriber" which maintained a pen point and paper roll in relative motion so that a compressed zigzag line was continuously formed on the paper. The color concentration was found to be equivalent to a line of over 15,000 feet in length per cubic centimeter of ink consumed.

The light fastness of a sample of writing made with the ink was tested by exposure to intense ultra-violet irradiation in the "Fade-O-Meter." Fading was only slight after 100 hours of exposure. The line remained well defined, adequately colored and easily legible after 500 hours of exposure.

The water fastness of a sample of writing made with the ink was tested by soaking the sample in water at room temperature for 48 hours. A good visible line was retained and the color did not bleed appreciably.

Microscopic examination of the ink after storage for 7 weeks showed that crystal formation was negligible.

EXAMPLE 2

An ink was made as described in Example 1 except that it contained 0.5% by weight of Victoria Green WB (New Colour Index Basic Green 4) as a shading component. The ink was similar in properties to that described in Example 1 except that a "jetter" black color tone was obtained.

EXAMPLE 3

An ink was made as described in Example 1 from the following formulation:

| Component: | Parts by weight |
|---|---|
| Color | 40 |
| Propylene glycol | 58.8 |
| Oleic acid | 1.2 |

The properties of the resulting ink were similar to those described for the ink of Example 1.

I claim:

1. An ink suitable for ball point pens, consisting essentially of a solution of a black colorant having the formula

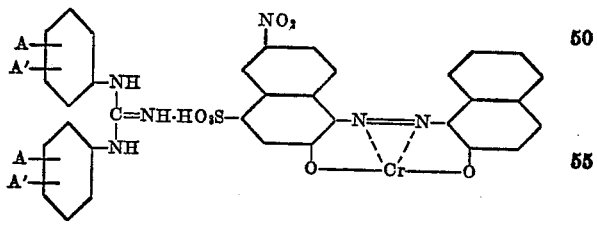

wherein A and A' each represents a member of the group consisting of H and $C_1$–$C_3$ alkyl, in a solvent having the formula $$R^xO(RO)_nH$$

wherein $R^x$ represents a member of the group consisting of H and $C_1$–$C_8$ alkyl, R represents $C_2$–$C_{10}$ alkylene, $n$ represents an integer from 1 to 5 inclusive, and the total number of carbon atoms is from 2 to 10, inclusive.

2. An ink as defined in claim 1 containing at least 25% of total colorant.

3. An ink as defined in claim 1, wherein the solvent comprises at least one diol.

4. An ink as defined in claim 1, wherein A and A' represent ethyl in ortho position and H, respectively.

5. An ink as defined in claim 4, wherein the solvent comprises at least one diol.

6. An ink as defined in claim 1, containing 40% to 50% of total colorant of which a major proportion is a di-(ortho ethyl phenyl) guanidine salt of the acid form of New Colour Index Acid Black 52.

7. An ink as defined in claim 6 containing 40% to 50% of a di-(ortho ethyl phenyl) guanidine salt of the acid form of New Colour Index Acid Black 52.

8. An ink as defined in claim 6, wherein the solvent comprises at least one diol.

9. An ink as defined in claim 7 wherein the solvent comprises at least one diol and 1%–5% of oleic acid.

References Cited in the file of this patent

UNITED STATES PATENTS

| 1,674,128 | Rose | June 19, 1928 |
| 2,022,678 | Kritchevsky | Dec. 3, 1935 |
| 2,165,034 | Daudt et al. | July 4, 1939 |
| 2,623,827 | Moos | Dec. 30, 1952 |

OTHER REFERENCES

Lubs: "The Chemistry of Synthetic Dyes and Pigments," pub. 1955 by Reinhold, N.Y.C. (pages 177–178).

Colour Index, 2nd ed. (1956), vol. 2 (pages 2840, 2853–4, 2882–3, 2896, 2904).

Gould et al.: "Inks for Ball Point Pens," American Ink Maker, July 1951 (pages 36–40 and 67).